(12) United States Patent
Gouskova et al.

(10) Patent No.: US 10,282,280 B1
(45) Date of Patent: May 7, 2019

(54) AUTOMATED SCALABLE VIDEO GAME TESTING SYSTEM

(71) Applicant: Electronic Arts Inc., Redwood City, CA (US)

(72) Inventors: Polina Igorevna Gouskova, San Fracisco, CA (US); Glen Alan Van Datta, Blaine, WA (US); Farah Mariam Ali, Bellevue, WA (US)

(73) Assignee: Electronic Arts Inc., Redwood City, CA (US)

( * ) Notice: Subject to any disclaimer, the term of this patent is extended or adjusted under 35 U.S.C. 154(b) by 0 days.

(21) Appl. No.: 15/939,898

(22) Filed: Mar. 29, 2018

(51) Int. Cl.
*G06F 9/445* (2018.01)
*G06F 11/36* (2006.01)
*G06F 17/30* (2006.01)
*G06N 7/00* (2006.01)

(52) U.S. Cl.
CPC ...... *G06F 11/3664* (2013.01); *G06F 11/3608* (2013.01); *G06F 11/3684* (2013.01); *G06F 17/30958* (2013.01); *G06N 7/005* (2013.01)

(58) Field of Classification Search
CPC ............. G06F 11/3608; G06F 11/3684; G06F 17/30958
See application file for complete search history.

(56) References Cited

U.S. PATENT DOCUMENTS

| 2009/0113303 A1* | 4/2009 | Goossen | A63F 13/10 715/719 |
| 2012/0204153 A1* | 8/2012 | Peterson | G06F 11/3672 717/124 |
| 2012/0311387 A1* | 12/2012 | Santhosh | G06F 11/3414 714/33 |

OTHER PUBLICATIONS

Franciny M. Barreto and Stephane Julia, Modeling and analysis of video games based on WorkFlow nets and State Graphs, 2014, retrieved online on Dec. 20, 2018, pp. 106-119. Retrieved from the Internet<URL: http://delivery.acm.org/10.1145/2740000/2735535/p106-barreto.pdf?>. (Year: 2014).*

* cited by examiner

*Primary Examiner* — Hanh Thi-Minh Bui
(74) *Attorney, Agent, or Firm* — Knobbe, Martens, Olson & Bear, LLP

(57) ABSTRACT

A method and system are presented that can model a video game in a state graph. The nodes can be configured to represent actions are performable in the video game. Using the state graph and test logs that journal actions performed by testers that played the video game, a plurality of scripts can be generated representing actions different users may perform when playing the video game. Further, by applying a probabilistic analysis to the test logs, weights can be applied to the state graph that reflect the likelihood that a user performs a particular action subsequent to a previously performed action. By generating a random walk of the state diagram, a script to simulate a player may be generated. By generating many scripts to simulate many players, it is possible to perform full scale realistic testing of the video game that matches the way human users play the video game.

20 Claims, 7 Drawing Sheets

AUTOMATED SCALABLE VIDEO GAME TESTING SYSTEM

BACKGROUND

Many video games are complex software applications that utilize a significant percentage of a computer system's resources. Each year the complexity of many of the latest video games pushes the boundaries of the latest computing systems. Modern video games comprise millions of lines of code. Testing the code of such large applications can be a time consuming and challenging process. Further, because video games are often programmed by teams of developers, changes made by one developer or team of developers working on one portion of the video game may impact code developed by another developer or team of developers working on another portion of the video game. Ensuring that a video game operates as desired can be particularly challenging when the video game is composed of different modules, which may be created independently, that are configured to operate together to create a single video game or application. Thus, code must often be tested and retested repeatedly as changes are made to the code by different teams.

SUMMARY OF EMBODIMENTS

The systems, methods and devices of this disclosure each have several innovative aspects, no single one of which is solely responsible for the all of the desirable attributes disclosed herein. Details of one or more implementations of the subject matter described in this specification are set forth in the accompanying drawings and the description below.

In certain embodiments of the present disclosure, a computer-implemented method is disclosed. This method may be implemented by an interactive computing system configured with specific computer-executable instructions. The method may include accessing source code for a video game under test. Further, the method may include determining a plurality of actions available in the video game under test. The plurality of actions may comprise in-game actions performable by a user when the user interacts with the video game under test. In addition, the method may include generating a state graph representing at least the plurality of actions available in the video game under test and accessing a plurality of test logs for the video game under test. Each test log may comprise an identity of actions performed during an execution of the video game under test. The method may further include generating a probabilistic state graph by assigning probability weights to edges within the state graph based at least in part on the plurality of test logs. A probability weight of an edge may be determined based at least in part on the percentage of test logs from the plurality of test logs that indicate that a first action associated with a node connected to a first end of the edge is performed subsequent to a second action associated with a node connected to a second end of the edge. In addition, the method may include generating a plurality of player simulation scripts based at least in part on the probabilistic state graph and initiating execution of the plurality of player simulation scripts with respect to at least one instance of the video game under test. Each player simulation script may cause a simulated user to perform one or more actions included in the player simulation script with respect to the at least one instance of the video game. Moreover, the method may include monitoring the execution of the plurality of player simulation scripts to determine whether errors exist in the source code of the video game under test.

In certain embodiments, determining the plurality of actions comprises traversing at least the source code of the video game. Further, the node connected to the first end of the edge may be the same as the node connected to the second end of the edge, and the first action and the second action are the same. In some embodiments, the plurality of player simulation scripts comprises at least 10,000 player simulation scripts. Further, the plurality of player simulation scripts may comprise at least one player simulation script that causes a simulated user to perform different actions than at least one other player simulation script of the plurality of player simulation scripts.

In some embodiments, the method further includes assigning a default probability weight to at least one edge of the state graph. Moreover, the method may further include identifying at least one edge in the state graph that is not traversed by a mapping of the plurality of test logs to the state graph and assigning a non-zero probability weight to the at least one edge. In certain embodiments, the method may include determining a second plurality of actions associated with one or more services accessible by the user when interacting with the video game under test. Generating the state graph may further include generating the state graph to represent at least the plurality of actions and at least the second plurality of actions. The one or more services may comprise a chat service; an auction service; a downloadable content service; a patch service; a social networking service; a network store; or an achievements tracker service.

For some embodiments, a percentage of the player simulation scripts that cause the simulated user to perform the first action subsequent to the second action match the probability weight assigned to the edge between the node connected to the first end of the edge and the node connected to the second end of the edge. Moreover, the method may include detecting an error during execution of a player simulation script from the plurality of player simulation scripts, identifying a state of the at least one instance of the video game under test and an action performed by the simulated user with respect to the at least one instance of the video game at a time that the error occurred, and outputting for display information corresponding to the state of the at least one instance of the video game and the action performed by the simulated user at the time that the error occurred.

Certain embodiments of the present disclosure relate to a system. The system may include an electronic data store configured to store at least source code for a video game under test and a scalable video game test system comprising one or more hardware processors. The scalable video game test system may be configured to execute specific computer-executable instructions to at least: access the source code for the video game under test from the electronic data store; determine a plurality of actions available in the video game under test; generate a state graph representing at least the plurality of actions available in the video game under test; access a plurality of test logs for the video game under test, each test log comprising an ordered list of actions performed by a user interacting with a test execution of the video game under test; generate a probabilistic state graph by assigning probability weights to edges within the state graph based at least in part on the plurality of test logs; generate a plurality of player simulation scripts based at least in part on the probabilistic state graph; and initiate execution of the plurality of player simulation scripts with respect to an instance of the video game, wherein each player simulation script causes a simulated user to perform the actions included in the player simulation script with respect to the instance of the video game.

In certain embodiments, the system may further include a client simulation system comprising computer hardware and configured to execute the video game under test. Further, the scalable video game test system may be further configured to initiate execution of at least one of the plurality of player simulation scripts at the client simulation systems. In certain embodiments, the scalable video game test system is further configured to determine the plurality of actions by at least traversing the source code of the video game. Further, the scalable video game test system may be further configured to adjust probability weights assigned to edges within the state graph such that each edge within the state graph is assigned a probability greater than zero and less than one on a scale of zero to one.

For some embodiments, the scalable video game test system is further configured to: determine a second plurality of actions associated with a service related to the video game; and modify the state graph to include nodes corresponding to the second plurality of actions. Further, the service may comprise an application that is accessed during execution of the video game or that modifies execution of the video game. Moreover, the scalable video game test system may be further configured to: detect an error during execution of a player simulation script from the plurality of player simulation scripts; identify a state of the instance of the video game and an action performed by the simulated user with respect to the video game at a time that the error occurred; and output for display information corresponding to the state of the instance of the video game and the action performed by the simulated user at the time that the error occurred.

Certain embodiments of the present disclosure relate to a non-transitory computer-readable storage medium storing computer executable instructions that, when executed by one or more computing devices, configure the one or more computing devices to perform particular operations. These operations may include: accessing the source code for the video game from the electronic data store; determining a plurality of actions available in the video game; generating a state graph representing at least the plurality of actions available in the video game; accessing a plurality of player logs for the video game, each player log comprising an ordered list of actions performed by a user interacting with the video game during execution of the video game, wherein at least one player log is associated with a different user than at least one other player log from the plurality of player logs, and wherein at least one player log is associated with a different instance of the video game than at least one other player log; generating a weighted state graph by assigning weights to edges within the state graph based at least in part on the plurality of player logs, wherein the weights correspond to a probability that a player performs an action represented by a node connected to the edge; generating a plurality of player simulation scripts based at least in part on the weighted state graph; and initiating execution of the plurality of player simulation scripts with respect to an instance of the video game, wherein each player simulation script causes a simulated user to perform the actions included in the player simulation script with respect to the execution of the video game.

In certain embodiments, the operations may further comprise: detecting an error during execution of a player simulation script from the plurality of player simulation scripts; identifying a state of the instance of the video game and an action performed by the simulated user with respect to the video game within a range of time corresponding to when the error occurred; and outputting for display information corresponding to the state of the instance of the video game and the action performed by the simulated user within the range of time corresponding to when the error occurred.

BRIEF DESCRIPTION OF THE DRAWINGS

Throughout the drawings, reference numbers are re-used to indicate correspondence between referenced elements. The drawings are provided to illustrate embodiments of the subject matter described herein and not to limit the scope thereof.

DETAILED DESCRIPTION OF EMBODIMENTS

Introduction

Figure 1:
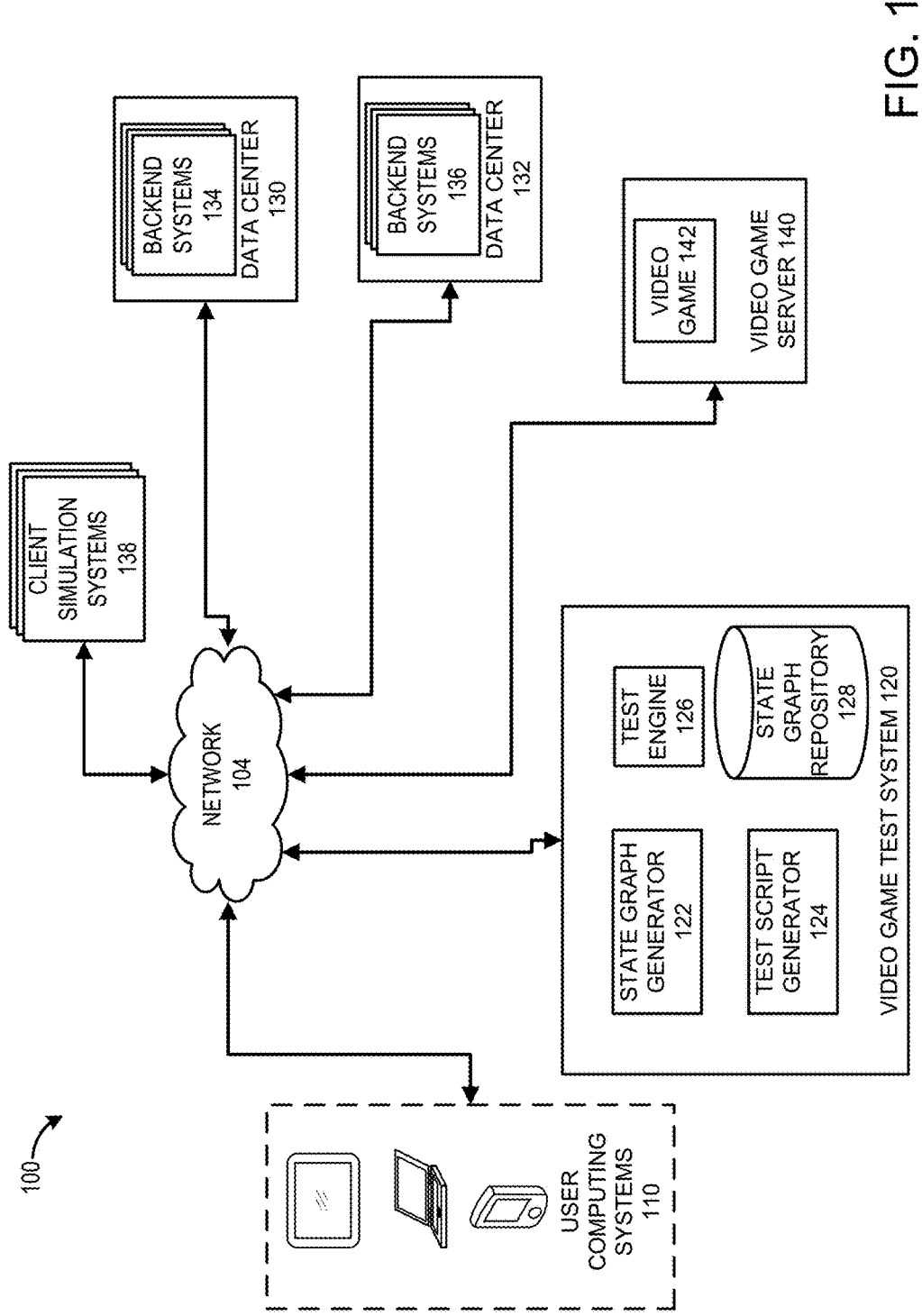
FIG. 1 illustrates an embodiment of a networked computing environment that can implement one or more embodiments of a scalable video game test system.

Testing large applications, such as modern video games can be complex and time-consuming. Part of testing video games includes testing different actions that users can perform when playing the video game. With many complex video games, the number of different types of actions that users can perform and the number of sequences in which the actions can be performed when playing the video game is immense. Even some relatively simple video games may have a large number of potential actions that can be performed while playing the video game. Further, the user may attempt to perform a particular type of action in many different times throughout the course of playing the video game, including times when performing the action is inappropriate or not possible. For example, a user may attempt to harm an object or character with a weapon that cannot be harmed or attempt to perform a jump when the user is swimming or flying. It is typically desirable to test both possible actions during the course of playing the video game and actions that may not be possible, but that a user may attempt to perform to make sure that the video game responds properly or as desired by the developer when the action is performed or attempted to be performed.

Some video games provide for multiple players to simultaneously play an instance of the video game. Further, some video games include persistent worlds that allow different players to join or leave the video game at different times of the day. Many such games, which can be referred to as massively multiplayer online (MMO) games, may support thousands, if not more, of players at the same time.

With conventional test systems, it is often not possible to perform full load system testing until a video game launches.

Moreover, it is typically not possible to perform realistic complete testing of a video game because, for example, it is difficult to anticipate every action players may perform and to predict every possible game play scenario when users are playing a video game. In addition, it can often be important to test the concurrency of actions that are performed by multiple players. To realistically test the concurrency of actions to a scale that may occur when the video game is released to the public, it may be necessary to have hundreds, thousands, tens of thousands of testers, or more. Further, it may be necessary to have these testers playing simultaneously. However, it can be difficult or impossible for an organization to have so many testers play-test the video game, particularly as the video game is being developed. Thus, although it may be possible to test different aspects or portions of the video game under test, it can be difficult or impossible to perform realistic complete system testing of a video game. Further, it may be difficult or impossible to perform testing of the video game to the same scale that is may be played upon release to the public.

Some aspects of the video game can be tested using scripts that are designed to simulate actions of a user playing the video game. The script can interact with the video game to perform the action a user might perform when playing the video game. However, for at least the reasons described above, it is difficult if not impossible to generate scripts to test a video game in its entirety including every possible action a user might perform at different times throughout the video game or when the video game is in different states.

Embodiments disclosed herein present a method and system that model a video game as a state graph that represents actions that can be performed in the video game by a single player or multiple players. Using the model of the video game and logs that journal actions testers have performed when playing the video game, a plurality of scripts can be generated representing actions that different users may perform when playing the video game. Further, by applying a probabilistic analysis to the logs of the testers, weights can be applied to the state graph that correspond to the likelihood that a user performs a particular action subsequent to a previously performed action. By generating a percentage of scripts to perform actions reflecting the percentage of test users that perform the actions, it is possible to perform automated full scale realistic testing of the video game. This automated testing may include having a computer simulate or emulate actions a user is likely to perform when playing the video game. Thus, it is possible to test the video game as if hundreds, thousands, hundreds of thousands, or any range of users between the foregoing were playing the game without having such numbers of users available. Testing the video game as if many users were playing when only a few or no users are playing is possible because, for example, most or all of the users can be simulated by test applications or test scripts performing the actions that users are expected to perform when playing the video game. Moreover, by generating the test scripts using a recordation of actions performed by human users, the test scripts can correspond to human user actions.

Developers sometimes attempt to manually test video games. Although a developer may test available actions in the game, it is not often possible for a developer to accurately determine what actions human users may perform when the game is released to the public, or all of the actions human users may perform. The scripts generated based at least in part on the state graph may reflect realistic real-world testing because, for example, they are generated based on an application of human user testing to a state graph to reflect the probabilities that a user performs an action. In certain embodiments, sequences of actions performed by a developer of the video game while testing the video game can be used to generate the initial state graph or to modify the state graph. For example, the likelihood that the developer follows action A with action B can be incorporated into the state graph. This may be accomplished by making the transition probability from action A to action B higher than an alternative transition and, therefore, the state graph is more representative of realistic gameplay as performed by the developers.

In certain embodiments, an automated testing process can be performed. Using the plurality of generated scripts, the video game can be tested to scale reflecting the amount of players that are expected to simultaneously play the video game on a server, or the number of players that the server can support. Further, the plurality of scripts can be configured to reflect the percentage of players that are expected to perform particular actions. Moreover, by applying a default non-zero weight to each edge within the state graph, embodiments disclosed herein can be used to test edge-cases or actions that developers do not expect the players to perform. Although certain actions may not be expected, often users will perform unexpected actions. By testing the edge cases, the chances of unexpected actions causing the video game to crash or enter an error state are reduced.

Moreover, by generating the scripts based on the logs of non-developer users, such as beta and alpha testers, it is possible to generate scripts that reflect actual players, rather than developers or publisher employed testers, who often do not accurately predict what actions players will perform with respect to the video game when it is sold to the public. In addition, because the scripts more accurately reflect post-release players, the scripts can be used to configure non-playable characters (NPCs) or computer controlled characters to behave more similarly to human players compared to configurations that a developer may generate for the NPCs or computer controlled characters.

To simplify discussion, the present disclosure is primarily described with respect to a video game. However, the present disclosure is not limited as such and may be applied to other types of applications. For example, embodiments disclosed herein may be applied to educational applications (for example, applications that help users learn a new language) or other applications where many users may simultaneously access the application of where the number of possible actions that a user may perform can be large, such as hundreds, thousands, tens of thousands, or some range between the foregoing.

Example Networked Computing Environment

FIG. 1 illustrates an embodiment of a networked computing environment 100 that can implement one or more embodiments of a scalable video game test system. The networked computing environment 100 includes the video game test system 120 that can test a video game 142. The video game test system 120 may be an automated scalable test system that can simulate a large number of users when testing the video game. The video game test system 120 may include one or more hardware processors configured to execute one or more instructions for testing the video game 142. Further, the video game test system 120 may include a number of systems, which may be implemented in hardware, software, or a combination of hardware and software, that facilitate testing the video game. The video game test system 120 may include the state graph generator 122, a test script generator 124, a test engine 126, and a state graph repository 128.

Figure 3:
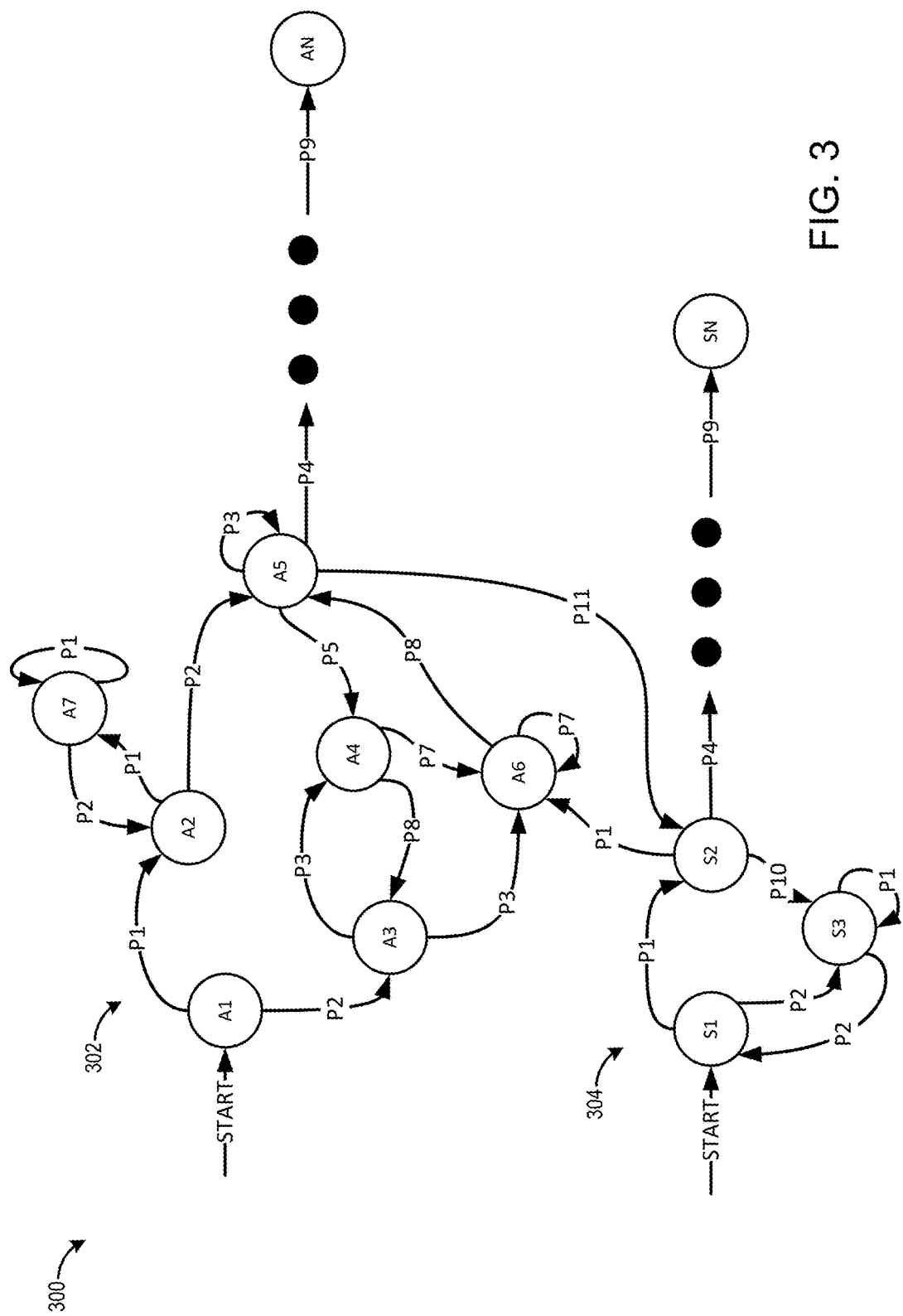
FIG. 3 presents an example of a state diagram of a video game in accordance with one or more embodiments disclosed herein.

The state graph generator 122 may include any system that can access source code for a video game, such as the video game 142 hosted by the video game server 140. Further, the state graph generator 122 may include any system that can traverse and/or analyze the source code for the video game to determine actions that may be performed by users who interact with an instance of the video game. The state graph generator 122 can generate a state graph that corresponds to or as reflective of the actions that can be performed by users who interact with the instance of the video game. An example of the state graph is illustrated in FIG. 3 and is described in more detail below. The state graph generated by the state graph generator 122 may be stored at the state graph repository 128. In some embodiments, the state graph repository 128 may store a plurality of state graphs for the video game 142, such as state graphs for different portions of the video game 142, for different versions of the video game 142, or with different weights applied to the state graph. Although illustrated as being included at the video game test system 120, in some embodiments, the state graph repository 128 may be located at a separate computing system.

The test script generator 124 may include any system that can generate a script for testing the video game 142 based at least in part on the state graph generated by the state graph generator 122. Further, the test script generator 124 can generate the script based on test data or logs generated during testing of an instance of the video game 142. Further, based on the logs generated during testing of the video game 142, the state graph generator 122 may apply weights to edges of the state graph based on the frequency that users performed one or more actions with respect to the video game 142. In certain embodiments, the test script generator 124 may generate the scripts based at least in part on the weights applied to the edges within the state graph.

The test engine 126 can include any system that can initiate testing of the video game 142. The test engine 126 may test the video game 142 by causing one or more of the scripts generated by the test script generator 124 to be performed during execution of an instance of the video game 142. In some embodiments, the scripts may be executed by one or more client simulation systems 138.

The client simulation systems 138 may include one or more computing systems of the game developer or game publisher that is managing test of the video game 142. These computing systems may include any type of computer that is capable of executing a video game 142. For example, the client simulation systems 138 may include any type of computing device(s), such as desktops, laptops, video game platforms, television set-top boxes, televisions (for example, Internet TVs), network-enabled kiosks, car-console devices, computerized appliances, wearable devices (for example, smart watches and glasses with computing functionality), and wireless mobile devices (for example, smart phones, PDAs, tablets, or the like), to name a few. In some embodiments, the client simulation systems 138 may include one or more servers configured to emulate one or more user computing systems 110 and may execute the video game 142 or a portion thereof. The one or more client simulation systems 138 can concurrently execute a number of scripts generated from the state graph enabling load testing of the video game 142. In some embodiments, a multiplayer video game 142 may execute without error when only one or a few users access the video game concurrently. Advantageously, by executing a large number of scripts concurrently, it is possible to detect errors in the source code of the video game that may occur when many users (for example, 100, 1000, 10,000 or more users) concurrently execute the video game 142.

In some embodiments, the video game server 140 may host or execute a portion of the video game 142, such as a server-side portion, while the client simulation systems 138 may host or execute another portion of the video game 142, such as a client-side portion. Moreover, the video game server 140 may include a developer system used for programming or developing the video game 142.

In certain embodiments, a video game may include a number of auxiliary services. Some of these auxiliary services may modify execution of the video game for at least a portion of users. Other auxiliary services may provide users with additional features when playing the video game, but may not affect execution of the video game. Some non-limiting examples of these auxiliary services include: an audio or text-based chat service that enables two or more users to chat with each other; the social networking service that enable users of the video game to establish a social networking connection, such as for users who desire to monitor user activity or to know when other users (for example friends) are playing the video game; an auction house; an achievements tracking or monitoring service for tracking and monitoring in game achievements; a patching service for patching or otherwise updating client portions of the video game 142; a downloadable content (DLC) management service that can provide users who purchase or otherwise obtain DLCs with access to the DLCs; a recording service that enables users to record actions by their in game characters within the video game; or any other services that may be provided to users of the video game 142 and that complement or modify execution of the video game 142.

One or more of these auxiliary services may be provided by backend systems 134 or 136 that are hosted by data centers 130 or 132. The data centers 130 and 132 may be located in different geographic areas. Thus, in certain embodiments, one or more of the auxiliary services may be provided by a backend system at a different location than one or more other auxiliary services. Further, the video game server 140 may be included in a data center that is in a different location than one or more of the backend systems that provide access to the auxiliary services. The backend systems 134 and 136 may include one or more computing systems that are configured to implement the previously described auxiliary services and/or to host one or more instances of the video game 142.

The user computing systems 110 may include one or more computing systems of users that are not employed by the developer or publisher of the video game 142. For example, the user computing systems 110 may be associated with users that have volunteered to perform beta testing on behalf of the developer or publisher of the video game 142. Beta testers generally include users that are unconnected with the developer and/or the development of the video game 142 beyond volunteering to test the video game 142. In some embodiments, the user computing systems 110 may include computing systems that are used by employees or affiliates of a developer, such as for alpha testing. Often testers generally include users that are affiliated with a developer or publisher of the video game 142 and that test the video game 142 prior to releasing the video game to beta testers or to the public.

The user computing system 110 may include hardware and software components for establishing communication with another computing system, such as the interactive computing system 130, over a communication network 104.

For example, the user computing system 110 may be equipped with networking equipment and network software applications (for example, a web browser) that facilitate communications via a network (for example, the Internet) or an intranet. The user computing system 110 may include a number of local computing resources, such as central processing units and architectures, memory, mass storage, graphics processing units, communication network availability and bandwidth, and so forth. Further, the user computing system 110 may include any type of computing system. For example, the user computing system 110 may include any type of computing device(s), such as desktops, laptops, video game platforms, television set-top boxes, televisions (for example, Internet TVs), network-enabled kiosks, car-console devices, computerized appliances, wearable devices (for example, smart watches and glasses with computing functionality), and wireless mobile devices (for example, smart phones, PDAs, tablets, or the like), to name a few. In some embodiments, the user computing system 110 may include one or more of the embodiments described below with respect to FIG. 6 and FIG. 7.

One or more of the systems of the networked computing environment 100 may communicate via a network 104. The network 104 can include any type of communication network. For example, the network 104 can include one or more of a wide area network (WAN), a local area network (LAN), a cellular network, an ad hoc network, a satellite network, a wired network, a wireless network, and so forth. Further, in some cases, the network 104 can include the Internet.

Overview of Automated Test Process

The systems of the networked computing environment 100 can be used to automatically test a portion of the video game 142 or the video game 142 in its entirety. Further, the systems of a networked computing environment 100 can be used to test the video game 142 at a scale that matches an expected number of users or a maximum number of users that can be supported by the video game server 140 that hosts a portion of the video game 142, such as a persistent world.

Figure 2:
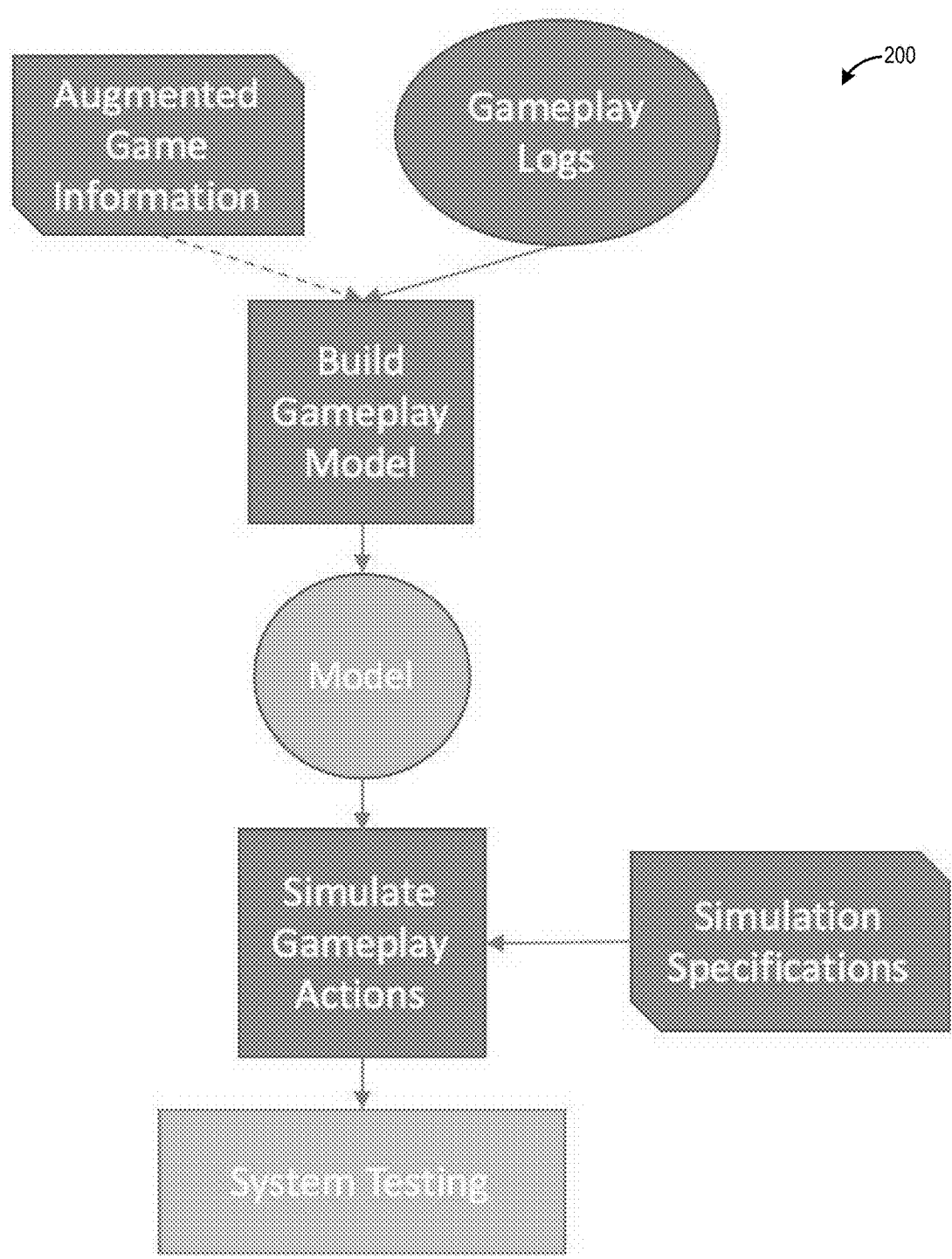
FIG. 2 presents a block diagram of an overview of an automated test process in accordance with one or more embodiments of a scalable video game test system.

FIG. 2 presents a block diagram 200 of an overview of an automated test process in accordance with one or more embodiments of a scalable video game test system, such as that illustrated in the networked computing environment 100. As illustrated in FIG. 2, a system configured to build a gameplay model can receive augmented game information and gameplay logs. The augmented game information may include source code for the video game and any other information about the video game, such as the types of characters that can be selected by a user to play the video game. The gameplay logs may include a journal of actions performed by testers that have previously tested the video game when interacting with the video game. These actions may include actions defined by the video game that are available to the user. For example, these actions may include causing a playable character to jump, run, shoot a weapon, perform a magic spell, consume an item, or any other action that may be available in the video game. Further, in some embodiments, actions may include interactions by user with a user interface that may or may not cause a defined action within the video game. For example, the action may include a user selecting a button on a gamepad, on a keyboard, or on a touch interface that is not associated with an action in the video game or that may be associated with an action in the video game that cannot be performed when the video game is in its current state (for example, a command to drink the health potion in the character has full health). These testers may be developers of the video game or other employees of the video game development company or publishing company, or users who have volunteered to be beta testers.

Once the model of the video game is created based on the augmented game information in the gameplay logs, the model may be used to simulate gameplay actions for a video game under test. This model may be a state graph that maps actions in the video game to nodes in the graph that are connected by edges based on an ordering in which the actions can be performed. For example, a node representative of a first action that can be performed directly after the second action may be connected to a node representing the second action with a directed edge that leads from the node representing the second action to the node representing the first action.

To simulate the gameplay actions, a script can be generated based on the model. The script may identify one or more actions to be performed at a client simulation system 138 by a simulated user. The generation of the script may be based on simulations specifications, which can identify particular aspects of the video game to be tested. Once the one or more scripts are generated, they may be used to simulate users playing the video game enabling the video game to be tested at a scale that reflects an expected number of users or a maximum number of users that will play the video game upon release of the video game to customers.

Example State Graph

FIG. 3 presents an example of a state diagram or state graph 300 of a video game 142 in accordance with one or more embodiments disclosed herein. The state graph 300 may be generated by traversing source code for the video game 142 to determine actions available in the video game 142 and an ordering in which actions may be performed. In some embodiments, some of the actions may be determined by analyzing logs or journals reflecting user interactions with the video game 142.

The first portion 302 of the state graph 300 illustrates actions that may be performed when playing the video game 142. Each node within the first portion 302 represents a particular action that may be performed when playing video game 142. The edge labeled start may be associated with the state of the video game 142 with execution of the video game is initialized. Alternatively, the edge labeled start may indicate the video game 142 in a particular state where a developer desires to begin testing of the video game 142. For example, if a developer desires to begin testing a video game at level 5 of a 10 level video game, the start arrow may indicate the state associated with the video game at the start of level 5.

Assuming the start edge corresponds to an initialization state of the video game 142, the node A1 may be representative of an available action that causes the video game 142 to start or to start a round of the video game 142 after the game has been initialized. The node A2 may indicate an action that causes a playable character to jump while the node A3 may indicate an action that causes a playable character to run. Each action node labeled "Ax" with x representing numbers 1-N within the graph 300 may represent different actions that may be performed within the video game 142. In other words, A1, A2, A3, . . . , AN may each represent different actions that can be performed when playing the video game 142. In some embodiments, nodes may exist for actions a user may perform, which may or may not cause an action to occur in the video game 142. For example, a button on a gamepad or keyboard that is not mapped to any action, or that is not mapped to an action when the game is in a particular state may still have a node within the state graph. Advantageously, in certain embodiments, by including nodes for actions that a user may perform that do not correspond to an action in the video game 142, it is possible to generate a script that tests for cases where a user performs an unsupported action enabling the video game test system 120 to determine whether the video game 142 responds as desired by a developer when a user attempts to perform an unsupported action (for example, properly captures an improper input without causing the video game to crash).

The edges between the nodes may indicate that an action at the head of the edge may be performed subsequent to performance of an action at the tail of the edge. Thus, after a user starts the video game 142, the user can decide to cause the playable character to run or to jump. In some cases, a user can elect to perform actions repeatedly. For example, if the action A5 is associated with a playable character firing an arrow, a user may elect to fire multiple arrows consecutively without any action in between as represented by the self-loop at node A5. In some embodiments, multiple nodes may represent the same action. For example, a separate node may represent the same action for different states of the video game or for different playable characters within the video game.

Each of the edges within the state graph 300 may be weighted based on the probability that a user performs an action associated with a node at the head of an edge in a directed graph subsequent to performing the action associated with the node at the tail of the edge. The probability may be determined based at least in part on a set of logs or journals recording the actions of one or more users playing the video game 142, such as test users or beta users. The probabilities applied to the edges in the graph 300 are represented by the labels P1 through P11. For example, P1 may be associated with a probability of 0.4 or 40% in P2 may be associated with a probability of 0.6 or 60% indicating that 60% of the time a user will perform an action associated with the node A3 after performing the action associated with the node A1 and 40% of the time the user will perform an action associated with the node A2 after performing the action associated with the node A1. In certain embodiments, the state graph 300 may be or may be referred to as a probabilistic state graph. The probabilistic state graph identifies the probability that a particular connected node is visited when at a particular node. For example, when at node A1, the probability P1 identifies the probability of transitioning to node A2 and the probability P2 identifies the probability of transitioning to node A3 when performing a random walk of the state graph 300.

In some embodiments, the state graph 300 may include a second portion 304 representative of actions that may be performed when interacting with a service that can be used in conjunction with the video game 142 or that can alter the state of the video game 142. For example, the second portion 304 may represent actions that can be performed when interacting with a chat service that enables a user to chat with other users that are playing the video game 142 or actions associated with an auction service that enables a user to sell items obtained when playing the video game 142 or to purchase items from other users, such as a sword that can be used to make a character's attack more powerful when playing the video game 142. Advantageously, by including actions associated with services that may be performed in conjunction with the video game 142 for that may alter the state of the video game 142, it is possible to generate scripts that test the effect of using the services on the video game 142.

In the example illustrated in FIG. 3, actions associated with the service correspond to the nodes S1 through SN. Further, as can be observed by the edge that connects the node S2 to the node A6, it is possible for an action within the video game 142 to be formed subsequent to an action performed with respect to the service associated with the second portion 304 of the state graph 300. For example, after performing an action to purchase an item from an auction house, a user may select an action within the video game 142 to equip the item.

Similarly, an action with respect to a service may be performed after an action performed within the video game 142 is illustrated by the edge connecting the node A5 to the node S2. For example, after a user performs an action within the video game 142, the user may elect to talk or chat with another player using a chat service, which may be integrated into the video game 142 are accessible from the video game 142, which may be a separately managed service hosted at a different data center or backend system than the video game 142.

It should be understood that over time the state graph 300 may change. For example, as test data is obtained from more users or after more played instances of the video game 142 occur, the probabilities applied to different edges in the state graph may change. Further, as the source code for the video game 142 changes, the nodes and connections between nodes may change. Some nodes may be added representing additional actions that can be performed, or additional actions that may be performed for a particular state of the video game 142. Other nodes may be removed as actions are removed from the game, or actions at particular states of the video game 142 are removed. In some cases, modifying the state graph 300 may include adding or removing links between nodes, or adjusting the weights applied to the links or edges. The source code may change for a number of reasons including, for example, as bugs are removed from the game, as more features are added to the game during development, as DLCs or other expansions are added after the game is released, as new services are added that can interact with the video game or be used while the video game is playing, and the like. Each of these aforementioned changes or additions to the source code may result in a change to the state graph 300.

In certain embodiments, the state graph 300 incorporates both the state of the video game and the action performed by the user. For example, each node in the state graph 300 may be associated with a particular state of the video game and a particular action. In some embodiments, if a user attempts to perform an action that is invalid for the particular state of the video game, the action may not be performed and the state of the video game may not transition. For example, if the most recent action performed is associated with the node A2 and the state of the video game is a state where it is not possible to jump (for example, the character is crouched within a tunnel), then an attempt to transition to a node A5 associated with performing a jump may be invalid and not permitted. In some embodiments, the total of the probability values associated with the outgoing edges from a node may be less than 1 or 100% as there may be a probability value associated with a user attempting to perform an invalid action. If the user attempts to perform the invalid action, the state may not transition. Alternatively, a traversal of the state graph may indicate a transition to an invalid action state, which may be captured by a log, but may not cause the video game state to change.

In some embodiments, multiple nodes may represent the same action, but associated with different states of the video game. For example, the node A2 may represent walking and the node A5 represent jumping when in an open area of the video game where jumping is permitted. Continuing the previous example, the node A4 may represent walking and the node A6 may represent jumping when in a tunnel where jumping is restricted. The change in state of the video game may differ when the user attempts to jump based on whether the state of the video game is associated with the node A2 or A4.

Example Model Generation Process

Figure 4:
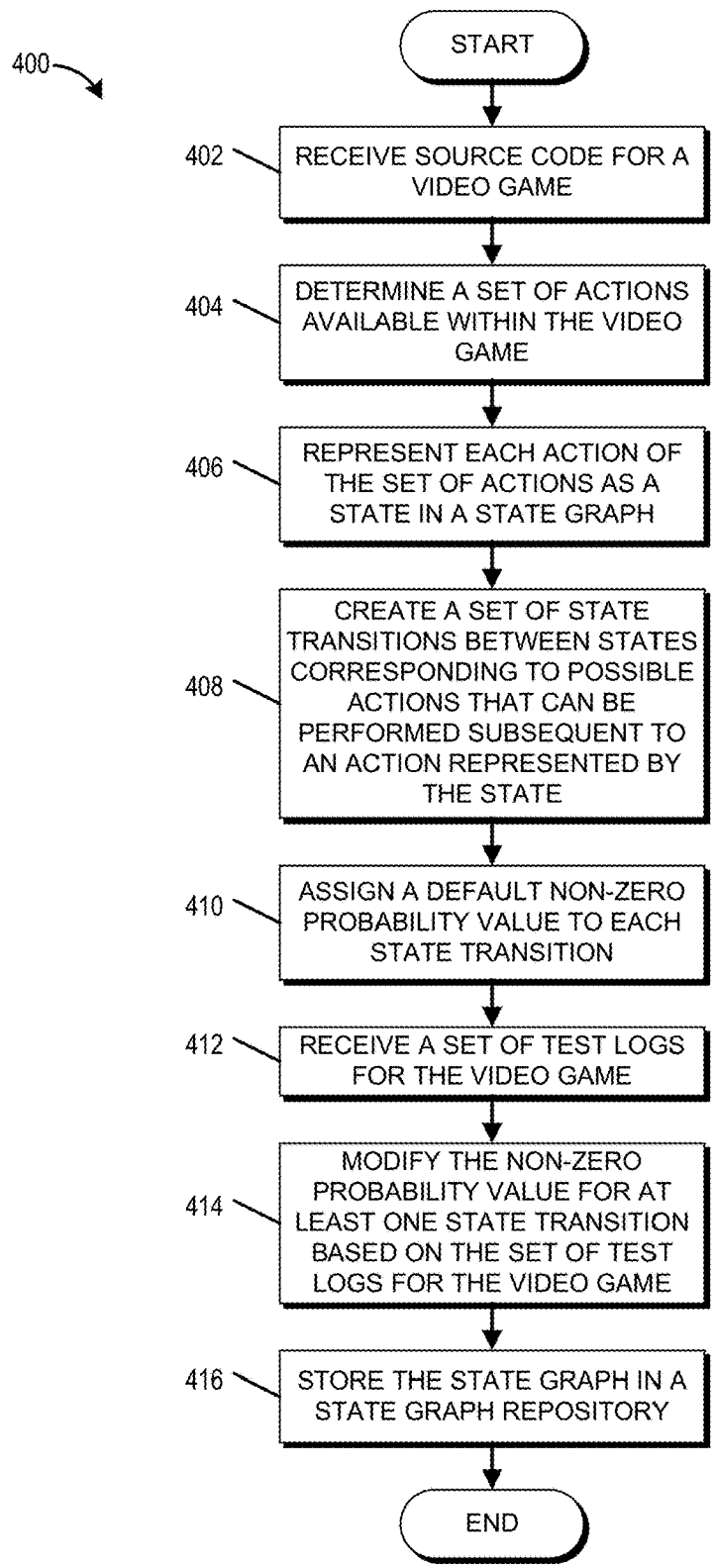
FIG. 4 presents a flowchart of an embodiment of a model generation process.

FIG. 4 presents a flowchart of an embodiment of a model generation process 400. The process 400 can be implemented by any system that can generate a model or state graph of a video game representative of actions that can be performed during execution of the video game. The process 400, in whole or in part, can be implemented by, for example, a video game test system 120, a video game server 140, or a state graph generator 122, among others. Although any number of systems, in whole or in part, can implement the process 400, to simplify discussion the process 400 will be described with respect to particular systems. Further, the process 400, or particular operations of the process 400 may be performed continuously or repeatedly for a video game 142. For example, at least portions of the process 400 may be configured to repeat each time a new test log or journal is received and/or each time a modification is made to the source code of the video game 142. In some embodiments, the process 400 can be performed after each nightly build of the source code of a video game 142 or at some other predetermined or identified time. Further, in some embodiments, the process 400 may be repeated when expansions or DLCs are made available for developed for the video game 142.

The process 400 begins at block 402 where the video game test system receives source code for a video game 142. The source code may be obtained from a source code repository (not shown) maintained by developers of the video game 142. In some embodiments, the source code is a portion of the entire source code for the video game 142. For example, in cases where a portion of the video game 142 is being tested, the source code may correspond to the portion of the video game 142 to be tested. For example, in some cases, a developer may decide to test a portion of the video game relating to a particular dungeon instead of the entire game. In such cases, the state graph, and the generated scripts may be based on the desired portion of the game instead of the entire video game. In some embodiments, the source code may include game data, assets, environment files, configuration files, or other data used by the source code or the executable code. Further, in some embodiments, the source code may include source code of the video game and source code associated with a game engine or library utilized by the video game.

At block 404, the state graph generator 122 determines a set of actions available within the video game 142. Determining the set of actions available in the video game 142 may include traversing the source code to determine available actions. In some embodiments, determining the set of action available in the video game 142 may also include analyzing game data associated with the video game 142. The available actions may be actions that a user can perform or that a user can cause a playable character to perform when the user interacts with the video game 142. For example, the actions may include causing a playable character to move, to use an item, to equip the item, or to perform some other defined action within the video game 142. In some embodiments, the set of actions may include one or more responses to interactions with the user interface. For example, a button on a gamepad that when pressed causes a playable character to jump may be associated with a jump action. In some such cases, a button on a gamepad that when pressed causes no action or change in the state of the video game 142 may be associated with a null action or no action. Advantageously, in certain embodiments, by including actions in the set of actions that are null actions, it is possible to test for errors in the video game 142 relating to improper handling of user interaction with a user interface that is expected to perform no action. For example, assume that a particular button on a gamepad may be expected to perform no action when the video game 142 is in a particular state. By including the particular button as an available action that is associated with a null action, or with performing no action when a user interacts with the button, it is possible to test for errors where an action is performed in response to interaction with the button or where an error in the processing of the button by the video game 142 occurs (for example, the code crashes) when a user interacts with the button.

Traversing the source code may include starting at a particular point within the source code, such as a method or function that initiates execution of the source code, and following various method or function calls to traverse the source code and to identify method or function calls that handle or capture user input. Further, traversing the source code may include identifying portions of the source code associated with actions that are performed in response to the received or capture user input.

At block 406, the state graph generator 122 represents each action of the set of actions as a state in a state graph. Representing each action as a state in the state graph may include assigning a node in the state graph to each action. The state graph may include a node for each possible action that may result in a change of game state. For example, a node may be associated with moving a character forward, making a character jump, having a character fire a weapon, having a character kick a ball, or having a character before some other action within the video game. Further, in some embodiments, the state graph may include a node for each interaction a user may perform with the user interface, including interaction with a button that is not associated with an in-game action. In some embodiments, one or more nodes associated with unexpected actions may be included in the state graph. For example, a node may be inserted for an action that is unintended but is possible because of an error in the code for the video game 142.

For each node in the state graph, the state graph generator 122, at block 408, creates a set of state transitions, or edges, between the node and one or more nodes corresponding to possible actions that can be performed subsequent to the action represented by the state. These edges may be directed edges with a tail leading from a node corresponding to the previously performed action and with a head pointing towards a node corresponding to an action that can be performed subsequently to the previously performed action. In some embodiments, some edges may create self-loops or point from a node back to itself. For example, if a node corresponds to a jump action and it is possible for a user to cause multiple jumps to occur in succession, and edge may lead from the node corresponding to the jump action back to itself. The node may include additional edges that point to other possible actions that can be performed after the jump action. For example, a note associated with the jump action may also include a directed edge leading to a node corresponding to a kick action. Thus, the user attempting to perform a jump kick may perform the jump action and then perform the kick action as indicated by the directed edge between the node corresponding to the jump action and the node corresponding to the kick action.

At block 410, the state graph generator 122 assigns a default nonzero probability value to each state transition or edge within the state graph. The default nonzero probability value may be defined by a user, such as an administrator or a developer of the video game. Advantageously, in certain embodiments, by providing a nonzero probability value to each state transition or edge in the state graph, it is possible to test the sequence of actions that have not previously been performed or are not included in any of the test logs received as part of the block 412. In certain embodiments, the default nonzero probability value may differ for different edges based at least in part on the actions connected by the edges. For example, edges between nodes relating to actions performed by a playable character may have a different default probability value than edges between nodes relating to actions within a configuration screen or an item equip screen. In certain embodiments, the block 410 is optional or omitted.

At block 412, the video game test system 120 receives a set of test logs for the video game 142. The set of test logs may represent a journal recording actions performed by one or more users interacting with the video game 142. These users may be developers or testers associated with the developer or publishing entity of the video game 142, such as alpha testers. Further, at least some of the users may be users that are not affiliated with the developer or publisher of the video game 142. For example, at least some of the set of test logs may be generated by monitoring recording actions performed by beta testers, or other pre-release testers or users, with respect to the video game 142. In certain embodiments, each test log is associated with a single play session of the video game 142 or a portion of the video game 142. Thus, in some cases, multiple test logs may be generated by a single user corresponding to multiple play sessions of the video game 142.

At block 414, the state graph generator 122 modifies the nonzero probability value for at least one state transition, or edge, of the state graph based at least in part on the set of test logs for the video game 142. The nonzero probability value may be modified to reflect the percentage of the test logs that performed the action associated with the node at the head end of the edge subsequent to performing the action associated with the node at the tail end of the edge. In certain embodiments, the nonzero probability value may be modified to reflect the percentage of test logs that indicate that the action associated with the node at the head end of the edge is performed subsequent to the action at the tail end of the edge. Thus, test logs where the action associated with the node at the tail end of the edge is not performed may not come in some cases, affect the modification of the nonzero probability value. In some cases, actions may be performed multiple times when playing a video game. Thus, in some cases, the percentage of occurrences of a second action subsequent to a first action may be different than a percentage of test logs indicating that the second action is performed subsequent to the first action. For example in some cases every test log me indicate that the second action is performed subsequent to the first action at least once. However, some test logs to have a higher percentage of occurrences of a second action performed subsequent to the first action than some other test logs. In certain embodiments, the probability value applied to an edge within the state graph may reflect a percentage of the total occurrences of the second action being performed subsequent to the first action.

In some embodiments, modifying a probability value for one state transition or edge may cause the probability value of another edge to be modified. Further, in certain embodiments, the probability value calculated for a particular edge based on the set of test logs may be further modified to satisfy particular conditions. For example, suppose that a first node corresponding to action has three edges leading to three other notes. Further, suppose that based on the set of test logs to the edges are assigned a probability value of 50% indicating that half the users perform a first action subsequent to the action associated with the first node and that the other half of the users perform the second action subsequent to the action associated with the first node. However, setting the probability value of two of the three edges to 50% would result in the third edge having a probability value of zero. In certain embodiments, to maintain a nonzero probability for all edges, the probability value of the two edges initially set to 50% may be reduced enabling the third edge to maintain at least a particular nonzero probability value. Advantageously, by ensuring that each node has at least a minimal nonzero probability value, edge cases may be tested for the video game 142.

At block 416, the video game test system 120 stores the state graph in a state graph repository 128. The state graph repository 128 may be included as part of the video game test system 120 or maybe a separate repository accessible by one or more video game test systems.

In certain embodiments, the process 400 may be used for services associated with the video game 142. These services may include one or more complementary applications or services that can be used to modify execution of the video game 142 or that may be executed in conjunction with the video game 142. For example, as previously described, services may include a chat service or an auction house service, among others. In some such embodiments, the block 402 may include receiving source code associated with the services or interacting with the services. Further, the block 404 may include determining the actions available as part of the service. The state graph generator 122 may include nodes in the state graph associated with actions performable with respect to the services. Moreover, weights may be applied to edges are transitions between states is associated with the services as well as with the video game 142. As previously illustrated in FIG. 3, the state graph for the video game 142 and the services may be combined as a single state graph. In other embodiments separate state graphs may be created for the video game 142 and the services.

Example Automated Game Test Process

Figure 5:
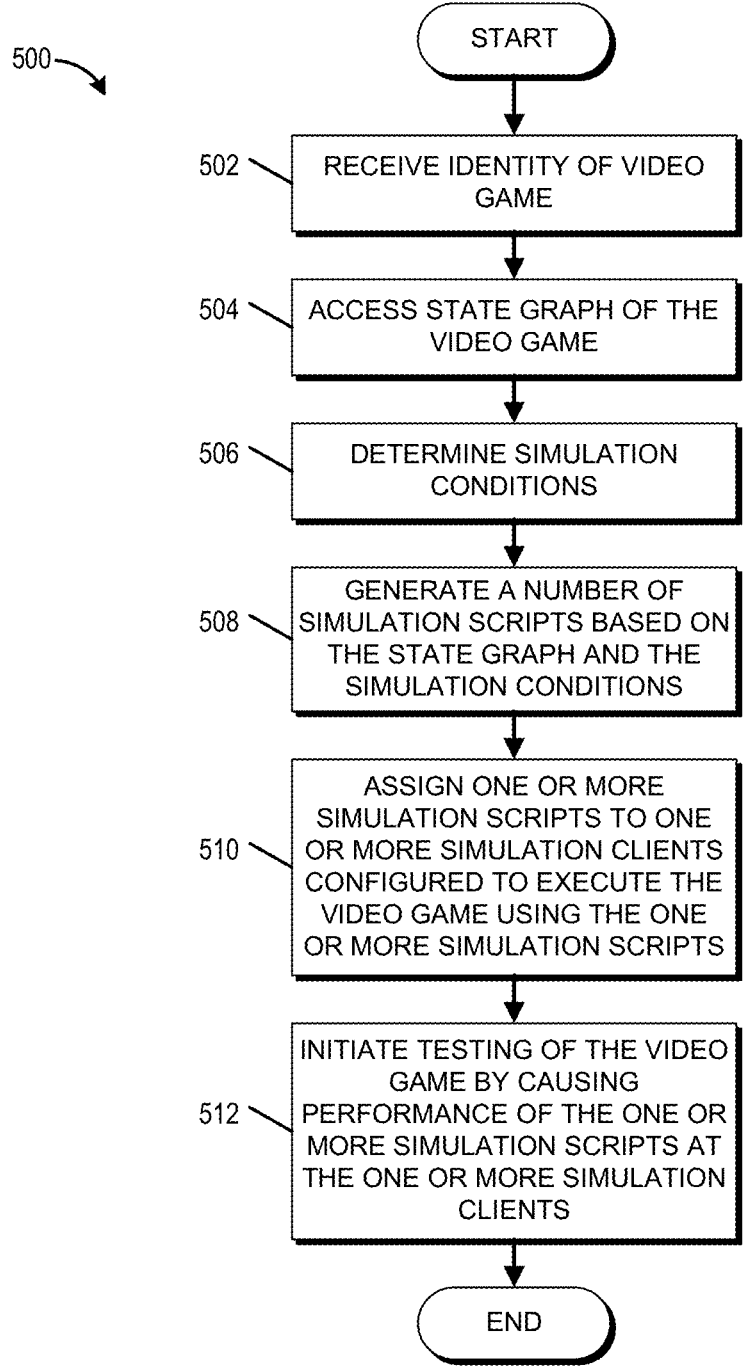
FIG. 5 presents a flowchart of an embodiment of an automated game test process.

FIG. 5 presents a flowchart of an embodiment of an automated game test process. The process 500 can be implemented by any system that can test a video game automatically and at a scale corresponding to post-release expectations or maximum thresholds for the video game. The process 500, in whole or in part, can be implemented by, for example, a video game test system 120, a video game server 140, a state graph generator 122, a test script generator 124, or a test engine 126, among others. Although any number of systems, in whole or in part, can implement the process 500, to simplify discussion the process 500 will be described with respect to particular systems. Further, the process 500, or particular operations of the process 500 may be performed automatically, at a scheduled time, or in response to a command. For example, the process 500 may be performed once a day, in response to a modification to source code for the video game 142 being made or checked in to a source code repository, in response to a new feature being added to the video game 142, or at defined development stages of the video game 142.

The process 500 begins at block 502 where the video game test system 120 receives an identity of a video game 142 to undergo a testing process. In some embodiments, the identity of the video game 142 is received from a user, such as a developer or tester of the video game 142. In other embodiments, an automated process provides the identity of the video game 142 to the video game test system 120. Receiving an identity of the video game may include receiving a link or pointer to source code for the video game or to an executable for the video game 142.

At block 504, the video game test system 120 accesses a state graph of the video game 142. The state graph may be accessed at or obtained from the state graph repository 128. The state graph may reflect an ordering of actions that may be performed during a play session of the video game. For example, as illustrated in FIG. 3, the state graph may identify an initial action that may be performed during the play session video game 142 and may include corrected links to nodes associated with actions that may be performed after the initial action. Further links may be included from the nodes connected to the node of the initial action to additional notes associated with yet further actions, and so on and so forth.

At block 506, the video game test system 120 determines one or more simulation conditions for testing the video game 142. The simulation conditions may be received from a user or may be included as part of a test configuration process. The simulation conditions may include: an identity of the number of users to simulate playing the video game 142; whether the video game 142 is to be executed or played in its entirety; a portion of the video game 142 to be played or tested; a type or a number of client simulation systems 138 to be used to represent user computing systems, such as the user computing systems 110; a configuration for the client simulation systems 138, a configuration for the video game 142 to be tested; a distribution or selection of the user selectable options for the video game 142, such as a distribution of user selectable playable characters; and any other conditions or options that may be selected to configure testing of the video game 142.

At block 508, the test script generator 124 generates a number of simulation scripts based on the state graph and the simulation conditions. Each simulation script may be configured to specify actions to be performed by a simulated user playing the video game 142. The actions that may be specified to be performed in a particular order is determined by the probabilistic weights included in the state graph generated as part of the process 400 and accessed at the block 504. At least some of the scripts may include a different set of actions or a different ordering for performing the actions comparatively some of the other scripts. The percentage of the scripts that include a particular set of actions or ordering of actions to be performed when simulating the video game 142 may be based on the probabilistic weights applied to the edges within the state graph. For example, if there is a 60% chance that the user will perform the first action and then perform a second action, 60% of the scripts may be configured so that the simulated user performs the first action and then the second action while 40% of the scripts may be configured to perform the first action and then an action other than the second action.

In some embodiments, the scripts may be generated by performing a random walk of the state graph. Performing a random walk may include generating a random, or pseudo random, number (for example, in the range of 0 to 1) at every state and using the random number to determine the next step. For example, continuing the previous example with the 60/40 split between whether the user performs the second action after the first action or a different action, if the random number is between 0 and 0.6, then the second action may be performed after the first action. On the other hand, if the random number is between 0.6 and 1, a different action may be performed after the first action. In certain embodiments, the actual percentage of test scripts that contain a transition from state 1 to 2 associated with performing the first action and then the second action may be slightly different from 60% because the process is being randomly simulated and the simulation may depend on the random number generated at some or all of the states.

In some embodiments, one or more scripts may specify the particular actions to be performed in a particular order by simulated user playing the video game 142. In other embodiments, one or more scripts may specify one or more loops or cycles of actions to be repeatedly performed by a simulated user playing the video game 142. In some cases, the scripts may identify a particular action or series of actions to be performed for different states of the video game 142. In some cases, the distribution of actions included in the scripts may differ from the probabilities included in the state graph. For example, a tester desiring to further test uncommonly performed actions or series of actions may specify, using the simulation conditions determined at the block 506, that the distribution of scripts for the selection of actions to be included in the scripts be inverse to the probabilities assigned to the edges in the state graph. Thus, actions that were performed less often by, for example, beta testers may be included more heavily in the scripts enabling greater testing of edge cases or less used features.

Generating the scripts may include performing a random, or pseudo-random, walk of the state graph. As the test script generator 124 or a thread of the video game test system 120 walks or traverses the state graph, the actions associated with the nodes visited may be added to a script. Whether a particular node is visited may be based on the weight applied to the edge between nodes. This weight may be based on the number of users that performed successive actions when playing the video game. Thus, the percentage of scripts that include particular sequences of actions may relate to the percentage of users, such as beta users, that performed particular sequences of actions.

The number of scripts generated by the script generator may be determined by the simulation conditions. For example, if the simulation conditions identify that the video game 142 is to be tested with 10,000 simultaneous users, 10,000 scripts may be generated. Alternatively, fewer scripts may be generated, but the use of some of the scripts may be repeated. The distribution of scripts among simulated users may be based on the weighting of edges between nodes in the state graph. For example, 25% of beta testers performed a jump, a run, and then a second jump action, and 75% of beta testers performed a run, a jump, and then a duck action, 25% of the scripts may be configured to cause a simulated user to perform a jump, a run, and then a second jump action, and 75% of the scripts may be configured to cause a simulated user to perform a run, a jump, and then a duck action. Alternatively, in certain embodiments, as previously described, a random walk may be used to generate each script independently. Each of the scripts may represent a single user. Thus, each simulated user may act based on a random walk of the state graph.

Although it is possible for a single script to be generated representing a single simulated user, typically a large number of scripts are generated to represent a large number of users enabling scale testing the video game 142. Thus, thousands or tens of thousands of scripts may be generated with each script enabling simulation of a user playing the video game 142. Each of the scripts may be generated one at a time, or as a batch based on random walks of the state graph. Advantageously, in certain embodiments, by generating the large number of scripts is possible to perform realistic testing of the video game 142 under conditions that may occur when the video game is sold or otherwise made available to the public. Moreover, using embodiments disclosed herein, it is possible to perform realistic testing of the video game 142 without requiring a large number of human users.

At block 510, the test engine 126 assigns one or more simulation scripts to one or more client simulation systems 138 that are configured to execute the video game 142 using the one or more simulation scripts. Assigning the one or more simulation scripts to the one or more client simulation systems 138 may include providing one or more of the simulation scripts to each of the client simulation systems 138.

At block 512, the test engine 126 initiates testing of the video game 142 by causing performance of the one or more simulation scripts at the one or more client simulation systems 138. In some embodiments, causing performance of the one or more simulation scripts may include providing the one or more simulation scripts to the client simulation systems 138. Further, initiating testing a video game may include causing the client simulation systems 138 to instantiate a client portion of the video game 142 and to simulate playing the video game 142 by performing the actions included in the scripts provided to the consummation systems 138. The client simulation systems 138 may communicate with the video game server 140 to play the video game 142 is part of the test process. The block 512 may include causing hundreds, thousands, tens of thousands, hundreds of thousands, millions, any range between the foregoing, or more of instances of the video game 142, or client portions of the video game 142 to execute and perform the scripts. Thus, in certain embodiments, it is possible to scale testing of the video game 142 to various loads. The client portions of the video game 142 may each communicate with the same server portion of the video game 142. Alternatively, some of the client portions of the video game 142 may communicate with different server portions of the video game 142 hosted by different computing systems.

In some embodiments, the scripts may include actions associated with services that may modify a state of the video game or that can be used while the video game 142 is played. In some such embodiments, the block 512 may include initiating instances of services and assigning one or more scripts to the client simulation systems 138 to perform actions included in the scripts with respect to the services. In some cases, the scripts for simulating the performance of actions at the video game 142 and simulating the performance of actions with respect to the services may be different. In other cases, the scripts may combine actions with respect to the video games and with respect to the services.

In some embodiments, the scripts are provided to a server that hosts the video game 142, such as the video game server 140. In some such embodiments, the server performs one or more of the scripts with respect to the video game 142 instead of, or in addition to, the client simulation systems 138 performing one or more of the scripts.

The test engine 126 may monitor execution of the video game 142 at the client simulation systems 138, at the video game server 140, or both the client simulation systems 138 and the video game server 140. The test engine 126 may detect errors that occur during execution of the video game 142. Further, the test engine 126 may monitor execution of the scripts to determine one or more actions associated with an error that may occur during execution of the video game 142.

In some embodiments, portions of the process 500 may be used to generate scripts or determine actions for non-playable game characters. Alternatively, or in addition, portions of the process 500 may be used to generate scripts or determine actions for computer controlled characters, including characters that may be controlled by a user or a computer. The scripts can be used for configuring computer controlled characters after the video game 142 is released to the public. In other words, in certain embodiments, the scripts can be used for more than just testing of the video game 142. The scripts may also be used for configuring computer controlled characters to act similarly to user controlled characters. Advantageously, in certain embodiments, by generating a script or determining actions for a character controlled by computer to perform using embodiments the process 500, computer controlled characters may act more similarly to user controlled characters than when a video game developer configures the computer control character. In certain embodiments, the scripts may be generated to include actions not often performed by users is determined based on the state graph. Advantageously, in certain embodiments, by generating scripts that use actions less frequently used by users, computer controlled characters can be configured to behave differently from users providing for diversity in character actions.

In certain embodiments, the set of player logs for a particular user that includes actions performed by the user when playing the video game 142 can be used to generate a state graph with edges weighted based on the number of occurrences of a particular series of actions performed by the user when playing the video game 142. Using the state graph and portions of the process 500, scripts can be generated for characters controlled by a computer. Advantageously, in certain embodiments, by using the state graph generated from the particular user's play sessions to determine scripts or actions to be performed by computer controlled characters, the computer controlled characters can be configured to act similarly to a play style of the particular user.

In some embodiments, the playstyle or actions performed by computer controlled characters may change over time. For example, a computer controlled character may initially act in a particular manner by performing particular actions as the video game 142 is played by a user. As information is collected about the user's playstyle, or types of actions performed when the video game is in a particular state, a state graph reflecting the user's playstyle or selectin of actions may be created and weighted according to the user's actions. Based on this state graph, the actions or playstyle of the computer controlled character can be modified. Thus, over time, the playstyle of the computer controlled character can be modified based on how a particular user plays. Advantageously, in certain embodiments, a difficulty of the video game 142 can be personalized to different users based on the individual user's playstyle or action selections.

In some embodiments, embodiments of the present disclosure may be used to detect that a character that the game developer or publisher intends to be controlled by a user is instead being controlled by a computer or application. Applications that are sometimes used to control characters or aspects of the video game 142 are often referred to as "bots." These bots are often used by users to gain an unfair advantage when playing the video game 142. For example, bots may be used to have a character perform a set of repeated actions to increase the in game currency available to the character or to increase the statistics of the character. The use of bots can often make a video game 142 less enjoyable for human users. In certain embodiments, one or more scripts or determinations of actions that human users are most likely to perform in the video game 142 is in particular states can be determined based at least in part on the state graph generated for the video game 142 using, for example, the process 400. By comparing the actions that a particular characters performing in the video game 142 to the actions that human users are most likely to perform as determined from the state graph for the video game 142, the likelihood can be determined that the character that the game publisher or developer intends to be controlled by a human user is actually being controlled by a bot or application. By determining that a character is being controlled by a bebop or application instead of a human user, an entity that publishes or maintains operation of the video game 142 for users can take corrective action, such as canceling a user's account associated with the bot controlled character or adjusting the state of the video game 142 with respect to the character to negate advantages obtained by the use of the bot.

Overview of Computing System

Figure 6:
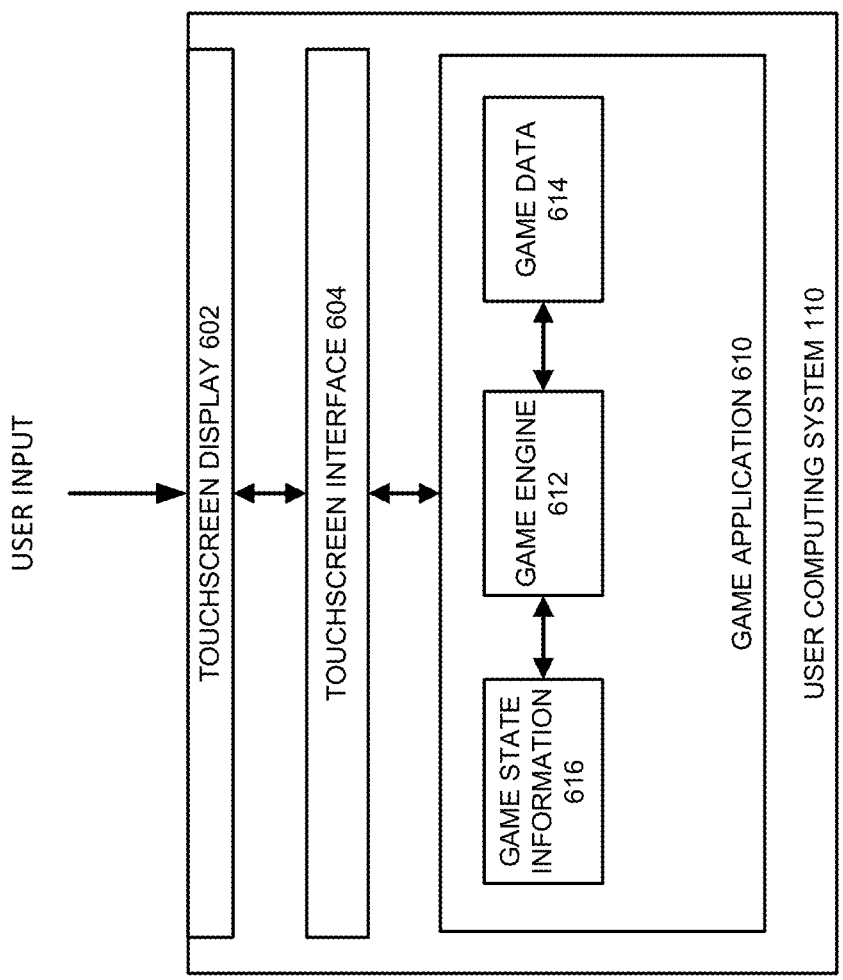
FIG. 6 illustrates an embodiment of a user computing system.

FIG. 6 illustrates an embodiment of a user computing system 110, which may also be referred to as a gaming system. As illustrated, the user computing system 110 may be a single computing device that can include a number of elements. However, in some cases, the user computing system 110 may include multiple devices. For example, the user computing system 110 may include one device that includes a central processing unit and a graphics processing unit, another device that includes a display, and another device that includes an input mechanism, such as a keyboard or mouse.

The user computing system 110 can be an embodiment of a computing system that can execute a game system. In the non-limiting example of FIG. 6, the user computing system 110 is a touch-capable computing device capable of receiving input from a user via a touchscreen display 602. However, the user computing system 110 is not limited as such and may include non-touch capable embodiments, which do not include a touchscreen display 602.

The user computing system 110 includes a touchscreen display 602 and a touchscreen interface 604, and is configured to execute a game application. This game application 610 may be the video game 112. Although described as a game application 610, in some embodiments the application 610 may be another type of application that may be capable of interacting with multiple users across multiple user computing systems, such as educational software or language software. While user computing system 110 includes the touchscreen display 602, it is recognized that a variety of input devices may be used in addition to or in place of the touchscreen display 602.

The user computing system 110 can include one or more processors, such as central processing units (CPUs), graphics processing units (GPUs), and accelerated processing units (APUs). Further, the user computing system 110 may include one or more data storage elements. In addition, the user computing system 110 may include one or more volatile memory elements, such as random-access memory (RAM). In some embodiments, the user computing system 110 can be a specialized computing device created for the purpose of executing game applications 610. For example, the user computing system 110 may be a video game console. The game applications 610 executed by the user computing system 110 may be created using a particular application programming interface (API) or compiled into a particular instruction set that may be specific to the user computing system 110. In some embodiments, the user computing system 110 may be a general purpose computing device capable of executing game applications 610 and non-game applications. For example, the user computing system 110 may be a laptop with an integrated touchscreen display or desktop computer with an external touchscreen display. Components of an example embodiment of a user computing system 110 are described in more detail with respect to FIG. 7.

The touchscreen display 602 can be a capacitive touchscreen, a resistive touchscreen, a surface acoustic wave touchscreen, or other type of touchscreen technology that is configured to receive tactile inputs, also referred to as touch inputs, from a user. For example, the touch inputs can be received via a finger touching the screen, multiple fingers touching the screen, a stylus, or other stimuli that can be used to register a touch input on the touchscreen display 602. The touchscreen interface 604 can be configured to translate the touch input into data and output the data such that it can be interpreted by components of the user computing system 110, such as an operating system and the game application 610. The touchscreen interface 604 can translate characteristics of the tactile touch input touch into touch input data. Some example characteristics of a touch input can include, shape, size, pressure, location, direction, momentum, duration, and/or other characteristics. The touchscreen interface 604 can be configured to determine the type of touch input, such as, for example a tap (for example, touch and release at a single location) or a swipe (for example, movement through a plurality of locations on touchscreen in a single touch input). The touchscreen interface 604 can be configured to detect and output touch input data associated with multiple touch inputs occurring simultaneously or substantially in parallel. In some cases, the simultaneous touch inputs may include instances where a user maintains a first touch on the touchscreen display 602 while subsequently performing a second touch on the touchscreen display 602. The touchscreen interface 604 can be configured to detect movement of the touch inputs. The touch input data can be transmitted to components of the user computing system 110 for processing. For example, the touch input data can be transmitted directly to the game application 610 for processing.

In some embodiments, the touch input data can undergo processing and/or filtering by the touchscreen interface 604, an operating system, or other components prior to being output to the game application 610. As one example, raw touch input data can be captured from a touch input. The raw data can be filtered to remove background noise, pressure values associated with the input can be measured, and location coordinates associated with the touch input can be calculated. The type of touch input data provided to the game application 610 can be dependent upon the specific implementation of the touchscreen interface 604 and the particular API associated with the touchscreen interface 604.

In some embodiments, the touch input data can include location coordinates of the touch input. The touch signal data can be output at a defined frequency. Processing the touch inputs can be computed many times per second and the touch input data can be output to the game application for further processing.

A game application 610 can be configured to be executed on the user computing system 110. The game application 610 may also be referred to as a video game, a game, game code and/or a game program. A game application should be understood to include software code that a user computing system 110 can use to provide a game for a user to play. A game application 610 might comprise software code that informs a user computing system 110 of processor instructions to execute, but might also include data used in the playing of the game, such as data relating to constants, images and other data structures. For example, in the illustrated embodiment, the game application includes a game engine 612, game data 614, and game state information 616. As previously stated, the embodiments described herein may be used for applications other than video games, such as educational software or videoconferencing. Thus, in some such cases, the game application 610 may be substituted with other types of applications that may involve multiple users communicating over a network and selecting a server, or one of the plurality of user computing systems, to act as a host.

The touchscreen interface 604 or another component of the user computing system 110, such as the operating system, can provide user input, such as touch inputs, to the game application 610. In some embodiments, the user computing system 110 may include alternative or additional user input devices, such as a mouse, a keyboard, a camera, a game controller, and the like. Further, the user computing system 110 may include a virtual reality display and/or an augmented reality display. A user can interact with the game application 610 via the touchscreen interface 604 and/or one or more of the alternative or additional user input devices. The game engine 612 can be configured to execute aspects of the operation of the game application 610 within the user computing system 110. Execution of aspects of gameplay within a game application can be based, at least in part, on the user input received, the game data 614, and game state information 616. The game data 614 can include game rules, prerecorded motion capture poses/paths, environmental settings, constraints, animation reference curves, skeleton models, and/or other game application information. Further, the game data 614 may include information that is used to set or adjust the difficulty of the game application 610.

The game engine 612 can execute gameplay within the game according to the game rules. Some examples of game rules can include rules for scoring, possible inputs, actions/events, movement in response to inputs, and the like. Other components can control what inputs are accepted and how the game progresses, and other aspects of gameplay. During execution of the game application 610, the game application 610 can store game state information 616, which can include character states, environment states, scene object storage, and/or other information associated with a state of execution of the game application 610. For example, the game state information 616 can identify the state of the game application at a specific point in time, such as a character position, character action, game level attributes, and other information contributing to a state of the game application.

The game engine 612 can receive the user inputs and determine in-game events, such as actions, collisions, runs, throws, attacks and other events appropriate for the game application 610. During operation, the game engine 612 can read in game data 614 and game state information 616 in order to determine the appropriate in-game events. In one example, after the game engine 612 determines the character events, the character events can be conveyed to a movement engine that can determine the appropriate motions the characters should make in response to the events and passes those motions on to an animation engine. The animation engine can determine new poses for the characters and provide the new poses to a skinning and rendering engine. The skinning and rendering engine, in turn, can provide character images to an object combiner in order to combine animate, inanimate, and background objects into a full scene. The full scene can be conveyed to a renderer, which can generate a new frame for display to the user. The process can be repeated for rendering each frame during execution of the game application. Though the process has been described in the context of a character, the process can be applied to any process for processing events and rendering the output for display to a user.

In some cases, at least some of the video game engine 612 may reside on a server, such as one of the video game servers 152. Further, in some cases, the complete video game engine 612 may reside on the server. Thus, in some cases, the video game engine 612 may be omitted from the portion of the video game application 610 hosted on the user computing system 110. Similarly, in some embodiments, video game state information 616 and video game data 614 may be hosted on a server in addition to or instead of on the user computing system 110. Further, in some cases, actions of the user performed within the video game application 610 may be transmitted to a server that is hosting a portion of the video game 610. The server may compute or determine the result of the user's interaction with respect to the video game application 610, such as collisions, attacks, or movements. The server may then send a result of the user's actions to the video game application 610 on the user computing system 110. The video game application 610 may then perform an action in response to the result, such as displaying the result to the user.

Example Hardware Configuration of Computing System

Figure 7:
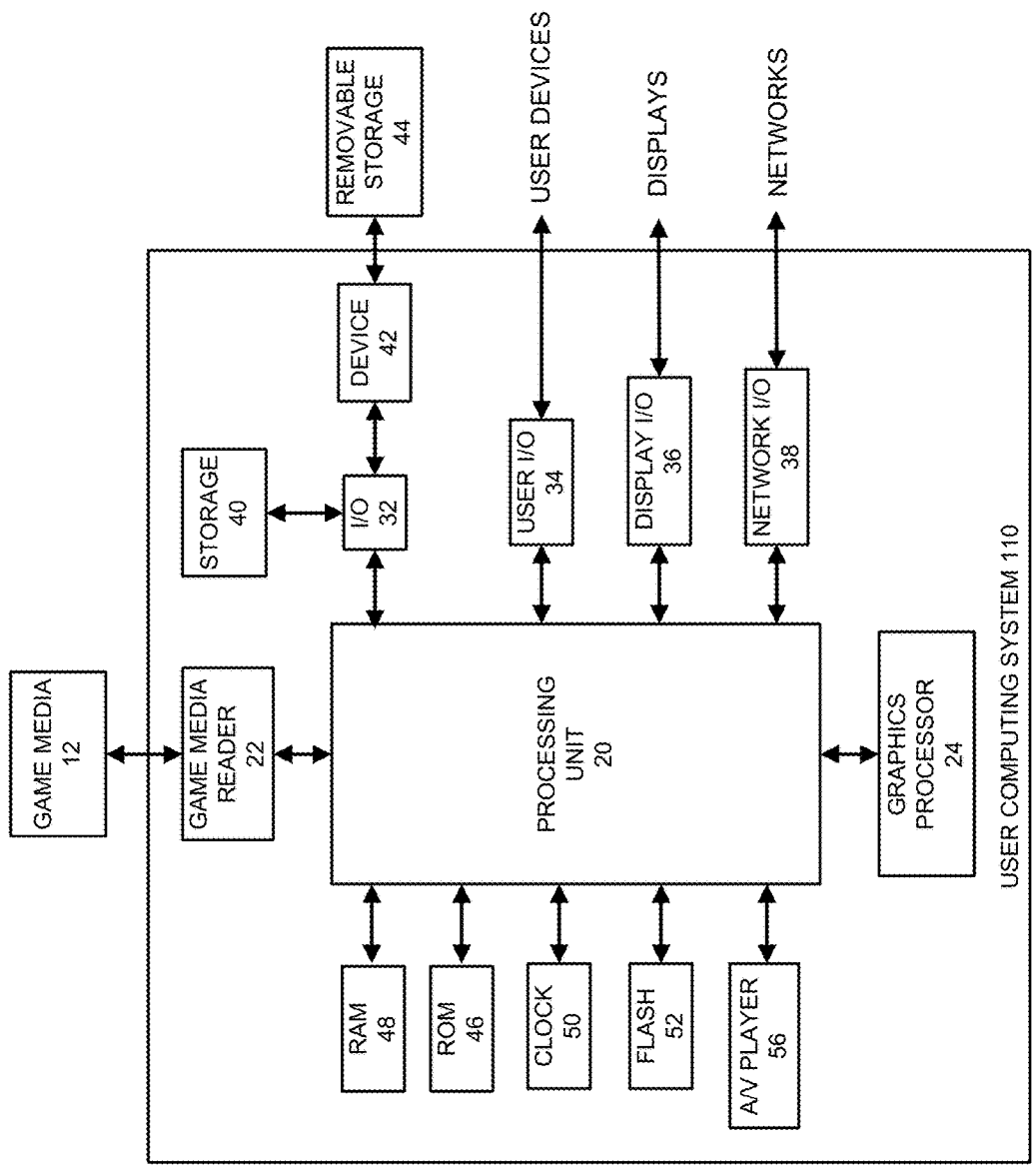
FIG. 7 illustrates an embodiment of a hardware configuration for the user computing system of FIG. 6.

FIG. 7 illustrates an embodiment of a hardware configuration for the user computing system 110 of FIG. 6. Other variations of the user computing system 110 may be substituted for the examples explicitly presented herein, such as removing or adding components to the user computing system 110. The user computing system 110 may include a dedicated game device, a smart phone, a tablet, a personal computer, a desktop, a laptop, a smart television, a car console display, and the like. Further, (although not explicitly illustrated in FIG. 7) as described with respect to FIG. 6, the user computing system 110 may optionally include a touchscreen display 602 and a touchscreen interface 604.

As shown, the user computing system 110 includes a processing unit 20 that interacts with other components of the user computing system 110 and also components external to the user computing system 110. A game media reader 22 may be included that can communicate with game media 12. Game media reader 22 may be an optical disc reader capable of reading optical discs, such as CD-ROM or DVDs, or any other type of reader that can receive and read data from game media 12. In some embodiments, the game media reader 22 may be optional or omitted. For example, game content or applications may be accessed over a network via the network I/O 38 rendering the game media reader 22 and/or the game media 12 optional.

The user computing system 110 may include a separate graphics processor 24. In some cases, the graphics processor 24 may be built into the processing unit 20, such as with an APU. In some such cases, the graphics processor 24 may share Random Access Memory (RAM) with the processing unit 20. Alternatively, or in addition, the user computing system 110 may include a discrete graphics processor 24 that is separate from the processing unit 20. In some such cases, the graphics processor 24 may have separate RAM from the processing unit 20. Further, in some cases, the graphics processor 24 may work in conjunction with one or more additional graphics processors and/or with an embedded or non-discrete graphics processing unit, which may be embedded into a motherboard and which is sometimes referred to as an on-board graphics chip or device.

The user computing system 110 also includes various components for enabling input/output, such as an I/O 32, a user I/O 34, a display I/O 36, and a network I/O 38. As previously described, the input/output components may, in some cases, including touch-enabled devices. The I/O 32 interacts with storage element 40 and, through a device 42, removable storage media 44 in order to provide storage for the user computing system 110. Processing unit 20 can communicate through I/O 32 to store data, such as game state data and any shared data files. In addition to storage 40 and removable storage media 44, the user computing system 110 is also shown including ROM (Read-Only Memory) 46 and RAM 48. RAM 48 may be used for data that is accessed frequently, such as when a game is being played, or for all data that is accessed by the processing unit 20 and/or the graphics processor 24.

User I/O 34 is used to send and receive commands between processing unit 20 and user devices, such as game controllers. In some embodiments, the user I/O 34 can include touchscreen inputs. As previously described, the touchscreen can be a capacitive touchscreen, a resistive touchscreen, or other type of touchscreen technology that is configured to receive user input through tactile inputs from the user. Display I/O 36 provides input/output functions that are used to display images from the game being played. Network I/O 38 is used for input/output functions for a network. Network I/O 38 may be used during execution of a game, such as when a game is being played online or being accessed online.

Display output signals may be produced by the display I/O 36 and can include signals for displaying visual content produced by the user computing system 110 on a display device, such as graphics, user interfaces, video, and/or other visual content. The user computing system 110 may comprise one or more integrated displays configured to receive display output signals produced by the display I/O 36, which may be output for display to a user. According to some embodiments, display output signals produced by the display I/O 36 may also be output to one or more display devices external to the user computing system 110.

The user computing system 110 can also include other features that may be used with a game, such as a clock 50, flash memory 52, and other components. An audio/video player 56 might also be used to play a video sequence, such as a movie. It should be understood that other components may be provided in the user computing system 110 and that a person skilled in the art will appreciate other variations of the user computing system 110.

Program code can be stored in ROM 46, RAM 48, or storage 40 (which might comprise hard disk, other magnetic storage, optical storage, solid state drives, and/or other non-volatile storage, or a combination or variation of these). At least part of the program code can be stored in ROM that is programmable (ROM, PROM, EPROM, EEPROM, and so forth), in storage 40, and/or on removable media such as game media 12 (which can be a CD-ROM, cartridge, memory chip or the like, or obtained over a network or other electronic channel as needed). In general, program code can be found embodied in a tangible non-transitory signal-bearing medium.

Random access memory (RAM) 48 (and possibly other storage) is usable to store variables and other game and processor data as needed. RAM is used and holds data that is generated during the play of the game and portions thereof might also be reserved for frame buffers, game state and/or other data needed or usable for interpreting user input and generating game displays. Generally, RAM 48 is volatile storage and data stored within RAM 48 may be lost when the user computing system 110 is turned off or loses power.

As user computing system 110 reads game media 12 and provides a game, information may be read from game media 12 and stored in a memory device, such as RAM 48. Additionally, data from storage 40, ROM 46, servers accessed via a network (not shown), or removable storage media 46 may be read and loaded into RAM 48. Although data is described as being found in RAM 48, it will be understood that data does not have to be stored in RAM 48 and may be stored in other memory accessible to processing unit 20 or distributed among several media, such as game media 12 and storage 40.

It is to be understood that not necessarily all objects or advantages may be achieved in accordance with any particular embodiment described herein. Thus, for example, those skilled in the art will recognize that certain embodiments may be configured to operate in a manner that achieves, increases, or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (for example, not all described acts or events are necessary for the practice of the algorithms). Moreover, in certain embodiments, acts or events can be performed concurrently, for example, through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, for example, a combination of a DSP and a microprocessor, a plurality of microprocessors, one or more microprocessors in conjunction with a DSP core, or any other such configuration. Although described herein primarily with respect to digital technology, a processor may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (for example, X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure.

What is claimed is:

1. A computer-implemented method comprising:
as implemented by an interactive computing system configured with specific computer-executable instructions,
accessing source code for a video game under test;
determining a plurality of actions available in the video game under test, wherein the plurality of actions comprises in-game actions performable by a user when the user interacts with the video game under test;
generating a state graph representing at least the plurality of actions available in the video game under test;
accessing a plurality of test logs for the video game under test, each test log comprising an identity of actions performed during an execution of the video game under test;
generating a probabilistic state graph by assigning probability weights to edges within the state graph based at least in part on the plurality of test logs, wherein a probability weight of an edge is determined based at least in part on the percentage of test logs from the plurality of test logs that indicate that a first action associated with a node connected to a first end of the edge is performed subsequent to a second action associated with a node connected to a second end of the edge;
determining simulation conditions associated with testing the video game under test;
generating a plurality of player simulation scripts based at least on the probabilistic state graph and the simulation conditions;
initiating execution of the plurality of player simulation scripts with respect to at least one instance of the video game under test, wherein each player simulation script causes a simulated user to perform one or more actions included in the player simulation script with respect to the at least one instance of the video game;
monitoring the execution of the plurality of player simulation scripts to determine whether errors exist in the source code of the video game under test;
detecting an error during execution of a player simulation script from the plurality of player simulation scripts;
identifying a state of the at least one instance of the video game under test and an action performed by the simulated user with respect to the at least one instance of the video game at a time that the error occurred; and
outputting for display information corresponding to the state of the at least one instance of the video game and the action performed by the simulated user at the time that the error occurred.

2. The computer-implemented method of claim 1, wherein determining the plurality of actions comprises traversing at least the source code of the video game.

3. The computer-implemented method of claim 1, wherein the node connected to the first end of the edge is the same as the node connected to the second end of the edge, and the first action and the second action are the same.

4. The computer-implemented method of claim 1, wherein the plurality of player simulation scripts comprises at least 10,000 player simulation scripts.

5. The computer-implemented method of claim 1, wherein the plurality of player simulation scripts comprises at least one player simulation script that causes a simulated user to perform different actions than at least one other player simulation script of the plurality of player simulation scripts.

6. The computer-implemented method of claim 1, further comprising assigning a default probability weight to at least one edge of the state graph.

7. The computer-implemented method of claim 1, further comprising:
identifying at least one edge in the state graph that is not traversed by a mapping of the plurality of test logs to the state graph; and
assigning a non-zero probability weight to the at least one edge.

8. The computer-implemented method of claim 1, further comprising determining a second plurality of actions associated with one or more services accessible by the user when interacting with the video game under test, wherein generating the state graph further comprises generating the state graph to represent at least the plurality of actions and at least the second plurality of actions.

9. The computer-implemented method of claim 8, wherein the one or more services comprise a chat service; an auction service; a downloadable content service; a patch service; a social networking service; a network store; or an achievements tracker service.

10. The computer-implemented method of claim 1, wherein a percentage of the player simulation scripts that cause the simulated user to perform the first action subsequent to the second action matches the probability weight assigned to the edge between the node connected to the first end of the edge and the node connected to the second end of the edge.

11. The computer-implemented method of claim 1, wherein the simulation conditions comprise one or more of: a number of simulated users to play the video game under test; an identity of a portion of the video game under test to test; an indication of whether to test the video game under test in its entirety; a type of computing system to execute the at least one instance of the video game under test; a number of computing systems to execute one or more instances of the video game under test; or a distribution of user selectable options for the video game under test among execution of the one or more instances of the video game under test.

12. A system comprising:
an electronic data store configured to store at least source code for a video game under test; and
a scalable video game test system comprising one or more hardware processors, the scalable video game test system configured to execute specific computer-executable instructions to at least:
access the source code for the video game under test from the electronic data store;
determine a plurality of actions available in the video game under test;
generate a state graph representing at least the plurality of actions available in the video game under test;
access a plurality of test logs for the video game under test, each test log comprising an ordered list of actions performed by a user interacting with a test execution of the video game under test;
generate a probabilistic state graph by assigning probability weights to edges within the state graph based at least in part on the plurality of test logs;
determine simulation conditions associated with testing the video game under test;
generate a plurality of player simulation scripts based at least on the probabilistic state graph and the simulation conditions;
initiate execution of the plurality of player simulation scripts with respect to an instance of the video game, wherein each player simulation script causes a simulated user to perform the actions included in the player simulation script with respect to the instance of the video game;
detect an error during execution of a player simulation script from the plurality of player simulation scripts;
identify a state of the instance of the video game and an action performed by the simulated user with respect to the video game at a time that the error occurred; and
output for display information corresponding to the state of the instance of the video game and the action performed by the simulated user at the time that the error occurred.

13. The system of claim 12, further comprising a client simulation system comprising computer hardware and configured to execute the video game under test, wherein the scalable video game test system is further configured to initiate execution of at least one of the plurality of player simulation scripts at the client simulation systems.

14. The system of claim 12, wherein the scalable video game test system is further configured to determine the plurality of actions by at least traversing the source code of the video game.

15. The system of claim 12, wherein the scalable video game test system is further configured to adjust probability weights assigned to edges within the state graph such that each edge within the state graph is assigned a probability greater than zero and less than one on a scale of zero to one.

16. The system of claim 12, wherein the scalable video game test system is further configured to:
determine a second plurality of actions associated with a service related to the video game; and
modify the state graph to include nodes corresponding to the second plurality of actions.

17. The system of claim 16, wherein the service comprises an application that is accessed during execution of the video game or that modifies execution of the video game.

18. The system of claim 12, wherein the simulation conditions comprise one or more of: a number of simulated users to play the video game under test; an identity of a portion of the video game under test to test; an indication of whether to test the video game under test in its entirety; a type of computing system to execute the at least one instance of the video game under test; a number of computing systems to execute one or more instances of the video game under test; or a distribution of user selectable options for the video game under test among execution of the one or more instances of the video game under test.

19. A non-transitory computer-readable storage medium storing computer executable instructions that, when executed by one or more computing devices, configure the one or more computing devices to perform operations comprising:
accessing the source code for the video game from the electronic data store;
determining a plurality of actions available in the video game;
generating a state graph representing at least the plurality of actions available in the video game;
accessing a plurality of player logs for the video game, each player log comprising an ordered list of actions performed by a user interacting with the video game during execution of the video game, wherein at least one player log is associated with a different user than at least one other player log from the plurality of player logs, and wherein at least one player log is associated with a different instance of the video game than at least one other player log;

generating a weighted state graph by assigning weights to edges within the state graph based at least in part on the plurality of player logs, wherein the weights correspond to a probability that a player performs an action represented by a node connected to the edge;

determining simulation conditions associated with testing the video game under test;

generating a plurality of player simulation scripts based at least on the weighted state graph and the simulation conditions;

initiating execution of the plurality of player simulation scripts with respect to an instance of the video game, wherein each player simulation script causes a simulated user to perform the actions included in the player simulation script with respect to the execution of the video game;

detecting an error during execution of a player simulation script from the plurality of player simulation scripts;

identifying a state of the instance of the video game and an action performed by the simulated user with respect to the video game within a range of time corresponding to when the error occurred; and outputting for display information corresponding to the state of the instance of the video game and the action performed by the simulated user within the range of time corresponding to when the error occurred.

20. The non-transitory computer-readable storage medium of claim 19, wherein the simulation conditions comprise one or more of: a number of simulated users to play the video game under test; an identity of a portion of the video game under test to test; an indication of whether to test the video game under test in its entirety; a type of computing system to execute the at least one instance of the video game under test; a number of computing systems to execute one or more instances of the video game under test; or a distribution of user selectable options for the video game under test among execution of the one or more instances of the video game under test.

\* \* \* \* \*

UNITED STATES PATENT AND TRADEMARK OFFICE
CERTIFICATE OF CORRECTION

PATENT NO. : 10,282,280 B1  
APPLICATION NO. : 15/939898  
DATED : May 7, 2019  
INVENTOR(S) : Polina Igorevna Gouskova Page 1 of 1

It is certified that error appears in the above-identified patent and that said Letters Patent is hereby corrected as shown below:

On the Title Page

Item (72), Inventors, should read:
-- (72) Inventors: Polina Igorevna Gouskova, San Francisco, CA (US);
          Glen Alan Van Datta, Blaine, WA (US);
          Farah Mariam Ali, Bellevue, WA (US);
          Jianjun Zhou, Belmont CA (US) --.

Signed and Sealed this
Twenty-seventh Day of September, 2022

Katherine Kelly Vidal
*Director of the United States Patent and Trademark Office*